United States Patent [19]

Hashimoto et al.

[11] 4,046,033
[45] Sept. 6, 1977

[54] CONTROL APPARATUS FOR AUTOMATIC TRANSMISSION

[75] Inventors: Masanao Hashimoto, Toyota; Takaaki Suzuki, Obara, both of Japan

[73] Assignee: Toyota Jidosha Kogyo Kabushiki Kaisha, Toyota, Japan

[21] Appl. No.: 614,700

[22] Filed: Sept. 18, 1975

[30] Foreign Application Priority Data

Apr. 17, 1975 Japan .................................. 50-45819

[51] Int. Cl.² ...................... B60K 41/18; F16H 47/00
[52] U.S. Cl. ......................................... 74/869; 74/645
[58] Field of Search ................ 74/865, 867, 868, 869, 74/856, 674, 679, 681, 687, 671, 720, 720 S, 730, 731, 732, 733, 645; 192/3.28, 3.29, 3.3

[56] References Cited

U.S. PATENT DOCUMENTS

| | | | |
|---|---|---|---|
| 2,903,910 | 9/1959 | Carnegie | 74/868 |
| 3,053,116 | 9/1962 | Christenson | 74/868 |
| 3,691,872 | 9/1972 | Schaefer | 74/869 |
| 3,818,783 | 6/1974 | Norris | 74/867 |

Primary Examiner—Samuel Scott
Assistant Examiner—Lance W. Chandler
Attorney, Agent, or Firm—Finnegan, Henderson, Farabow & Garrett

[57] ABSTRACT

A control apparatus for automatic transmissions of the type having an output shaft of an engine connected to an input shaft of a speed-change gear mechanism through a torque converter. A frictional engagement device is disposed in parallel to the torque converter for directly linking the output shaft to the input shaft and mechanically transmitting the engine power when it is actuated. The control apparatus automatically and hydraulically controls both the selective actuation of the speed-change gear mechanism and the selective actuation of the direct-linkage frictional engagement device through an arrangement of a governor valve, throttle valve, shift valve, pressure-reducing device, operation element, direct-linkage valve and an interlock valve. The direct-linkage valve introduces pressure to the interlock valve in response to a predetermined relationship of pressures generated by the throttle and governor valves, particularly during a relatively high speed drive condition of the vehicle. The interlock valve actuates the direct-linkage frictional engagement device during this period but temporarily relieves the direct-linkage frictional engagement device when the shift valve establishes a shift operation of the speed-change gear mechanism. The pressure-reducing device is provided between the shift valve and the speed-change gear mechanism to control the timing of the actuation of the speed-change gear mechanism. The operation element transmits pressure variations occurring before and after the pressure-reducing device to the interlock valve for actuation of that valve.

8 Claims, 4 Drawing Figures

4,046,033

CONTROL APPARATUS FOR AUTOMATIC TRANSMISSION

BACKGROUND OF THE INVENTION

This invention relates to a control apparatus for an automatic transmission in an automobile or the like, of the type having power transmitted from the engine to a speed-change gear mechanism through a fluid type torque converter, and a separate frictional engagement device disposed in parallel to the torque converter between the engine and the speed-change gear mechanism. More particularly, this invention relates to the aforesaid type of control apparatus for an automatic transmission which automatically and hydraulically controls the operation of the speed-change gear mechanism and the direct-linkage frictional engagement device in response to the engine output and vehicle speed.

Conventional automatic transmissions include types where power from an engine is transmitted to a speed-change gear mechanism through a fluid type torque converter. The damping effect of the torque converter provides vehicle speed changes having reduced shock sensations, without the need to intercept the transmitting of engine power as by a clutch device. Additionally, acceleration can be maximized during a low speed drive condition by use of the torque-increasing action. However, slippage is always occurring among the pump impeller, turbine runner and stator of a conventional torque converter in operation of an automatic transmission. The power transmission efficiency is therefore lower than in automatic transmissions having mechanical clutch mechanisms and results in an increase in fuel consumption and a reduction in the engine braking effect.

To overcome these disadvantages in automatic transmissions utilizing torque converters, it has been proposed to provide a frictional engagement device such as a clutch mechanism of the direct-linkage type in parallel to the torque converter. According to this proposal, power is transmitted through the torque converter only when the function of the torque converter is required, as for example, when the vehicle speed is changed or the torque is increased. At other times, primarily during a relatively high vehicle speed and constant drive condition, the power is transmitted at a high efficiency by means of the direct-linkage clutch mechanism.

If a manual system were used for controlling the torque converter and the direct-linkage clutch mechanism to achieve the above-described purpose, the operation becomes complicated and attainment of the desired control would vary depending on the skill of the driver. This would not be a practical system. Alternatively, if an electrical system were used to achieve this control, an electric control circuit would have to be provided, in addition to a fluid-pressure, speed-control system, for actuation of the speed-change mechanism of the automatic transmission using additional clutches or brakes. Accordingly, the total structure required becomes complicated and the reliability is not high.

SUMMARY OF THE INVENTION

Accordingly, it is a primary object of this invention to provide a new and improved hydraulic control apparatus which can be used in automatic transmissions of the type having a torque converter to eliminate the abovedescribed problems.

It is a further object of this invention to provide a new and improved integral control apparatus for use in automatic transmissions of the type having a direct-linkage frictional engagement disposed in parallel to the torque converter, which integral control apparatus controls both the operation of the speed-change gear mechanism and the direct-linkage frictional engagement device.

Another object of this invention is to provide an improved automatic control apparatus for operating the speed-change gear mechanism and the direct-linkage frictional engagement device in response to the engine output and vehicle speed.

Still another object of this invention is to provide a new and improved automatic control apparatus for automatic transmissions which actuates the direct-linkage frictional engagement device for mechanically transmitting the engine power during a vehicle drive condition when no torque-increasing action is performed by the torque converter, and which relieves the directlinkage frictional engagement device during a speed shift condition when the torque converter takes over.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the control apparatus of the invention is for automatic transmissions of the type having an output shaft of an engine operatively connected to an input shaft of a speedchange gear mechanism through a torque converter, and a frictional engagement device disposed in parallel to the torque converter for directly linking the output shaft to the input shaft, the control apparatus comprising means for automatically and hydraulically controlling both the selective actuation of the speed-change gear mechanism in response to the engine output and vehicle speed, and the selective actuation of the frictional engagement device for directly linking the output shaft of the engine to the input shaft of the speed-change gear mechanism in response to a predetermined engine output and vehicle speed.

Preferably, the speed-change gear mechanism has a planetary gear train responsive to a hydraulicaly actuated speed-change frictional engagement device and the control apparatus includes (1) governor valve means designed to be responsive to the drive speed of the vehicle for generating a governor pressure corresponding to the drive speed; (2) throttle valve means for generating a throttle pressure corresponding to the opening of a throttle valve of the engine carburetor; (3) shift valve means operatively connected to the speed-changed frictional engagement device and responsive to the pressures generated by the throttle valve means and the governor valve means for hydraulically controlling the actuation of the speed-change frictional engagement device and the shifting of the speed-change gear mechanism from one gear ratio to another; (4) direct-linkage valve means operatively connected to the direct-linkage frictional engagement device and responsive to a predetermined relationship of the pressures generated by the throttle valve means and the governor valve means for hydraulically controlling the actuation of the directlinkage frictional engagement device; (5) pressure-reducing means for controlling fluid pressure received by the speed-change frictional engagement device from the shift valve and adjusting the timing of actuation of the speedchange frictional engagement device; (6) operation means for accepting the fluid pressure being received by the pressure-reducing means from the shift valve means and the controlled fluid pressure being received by the speedchange frictional engagement device from the pressure-reducing means; and (7) interlock valve means operatively connected to the operation means and disposed between the direct-linkage frictional engagement device and the direct-linkage valve means for introducing to the direct-linkage frictional engagement device the fluid pressure from the direct-linkage valve means and exhausting fluid pressure from the direct-linkage frictional engagement device in response to the fluid pressures from the operation means acting on the interlock valve means, the interlock valve means introducing fluid pressure to the direct-linkage frictional engagement device when receiving fluid pressure from the direct-linkage valve means and exhausting fluid pressure from the direct-linkage frictional engagement device when deactuated by the fluid pressures from the operation means acting on the interlock valve means during a speed shift operation of the speed-change gear mechanism from one gear ratio to another.

The invention consists in the novel parts, constructions, arrangements, combinations and improvements shown and described. The accompanying drawings, which are incorporated in and constitute a part of this specification, illustrate one embodiment of the invention and, together with the description, serve to explain the principles of the invention.

DETAILED DESCRIPTION OF THE DRAWINGS

Reference will now be made in detail to the present preferred embodiment of the invention, an example of which is illustrated in the accompanying drawings.

Figure 1:
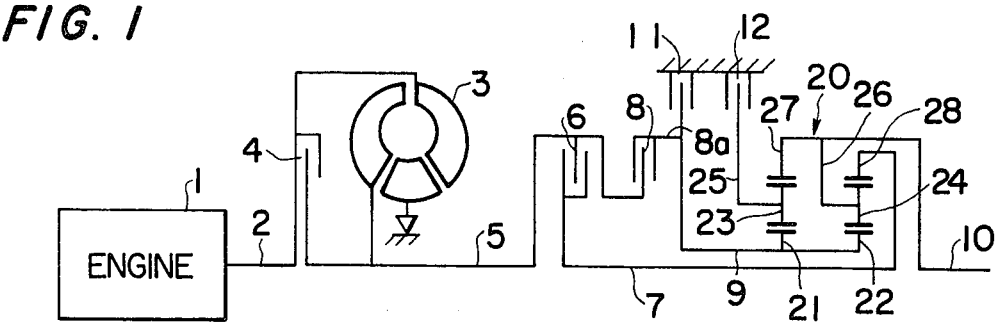
FIG. 1 is a schematic diagram illustrating an automatic transmission employing the teachings of this invention.

Referring to FIG. 1, one embodiment of an automatic transmission, employing the teachings of this invention, is shown having an output shaft 2 of an engine 1 connected to an input shaft 5 of a speed-change gear mechanism through a torque converter 3 and a direct-linkage frictional engagement device such as a clutch 4 disposed in parallel to torque converter 3. The input shaft 5 is connected to an intermediate shaft 7 through a front clutch 6 and is also connected to another intermediate shaft 9 through a rear clutch 8. These intermediate shafts 7 and 9 are connected to an output shaft 10 of the speedchange gear mechanism through a planetary gear train 20 of the speed-change gear mechanism. This planetary gear train 20 may be a conventional one such as a Simpson type. Train 20 comprises sun gears 21 and 22 formed on intermediate shaft 9, pinions 23 and 24, carriers 25 and 26 rotatably pivoting pinions 23 and 24 respectively, a ring gear 27 connected to output shaft 10 and to carrier 26, and a ring gear 28 connected to intermediate shaft 7. A front brake 11 is mounted on drum 8a of rear clutch 8 and integrated with sun gears 21 and 22. A rear brake 12 is mounted on carrier 25.

When direct-linkage clutch 4 is inoperable or relieved, the power from the engine is transmitted only through torque converter 3 to input shaft 5. When direct-linkage clutch 4 is operable or engaged, the power is transmitted through both torque converter 3 and direct-linkage clutch 4. However, since the transmission efficiency of torque converter 3 is much lower than that of direct-linkage clutch 4, the power is transmitted primarily and mechanically through direct-linkage clutch 4. The power transmitted to input shaft 5 is then transmitted to ring gear 28 of planetary gear unit 20 through intermediate shaft 7 by engagement of front clutch 6 during a forward drive condition. In this state, when carrier 25 is locked by the action of rear brake 12, a low speed rotation of the highest gear ratio of the speed-change gear mechanism is given to output shaft 10 and the first speed running condition is established. When both sun gears 21 and 22 are locked by the action of front brake 11, output shaft 10 is accelerated to shift from the first speed to the second speed running condition. Further, when rear clutch 8 is also engaged, the power from input shaft 5 is also given to sun gears 21 and 22. In this event, the planetary gear train 20 is integrated and the power thereof is applied directly to output shaft 10 to establish the highest speed, namely the third speed running condition. When rotation of carrier 25 is locked by action of rear brake 12 as the power from input shaft 5 is transmitted to sun gears 21 and 22 through intermediate shaft 9 by action of rear clutch 8, the direction of rotation of output shaft 10 is reversed by means of pinion 23 to establish the reverse speed running condition.

Figure 2:
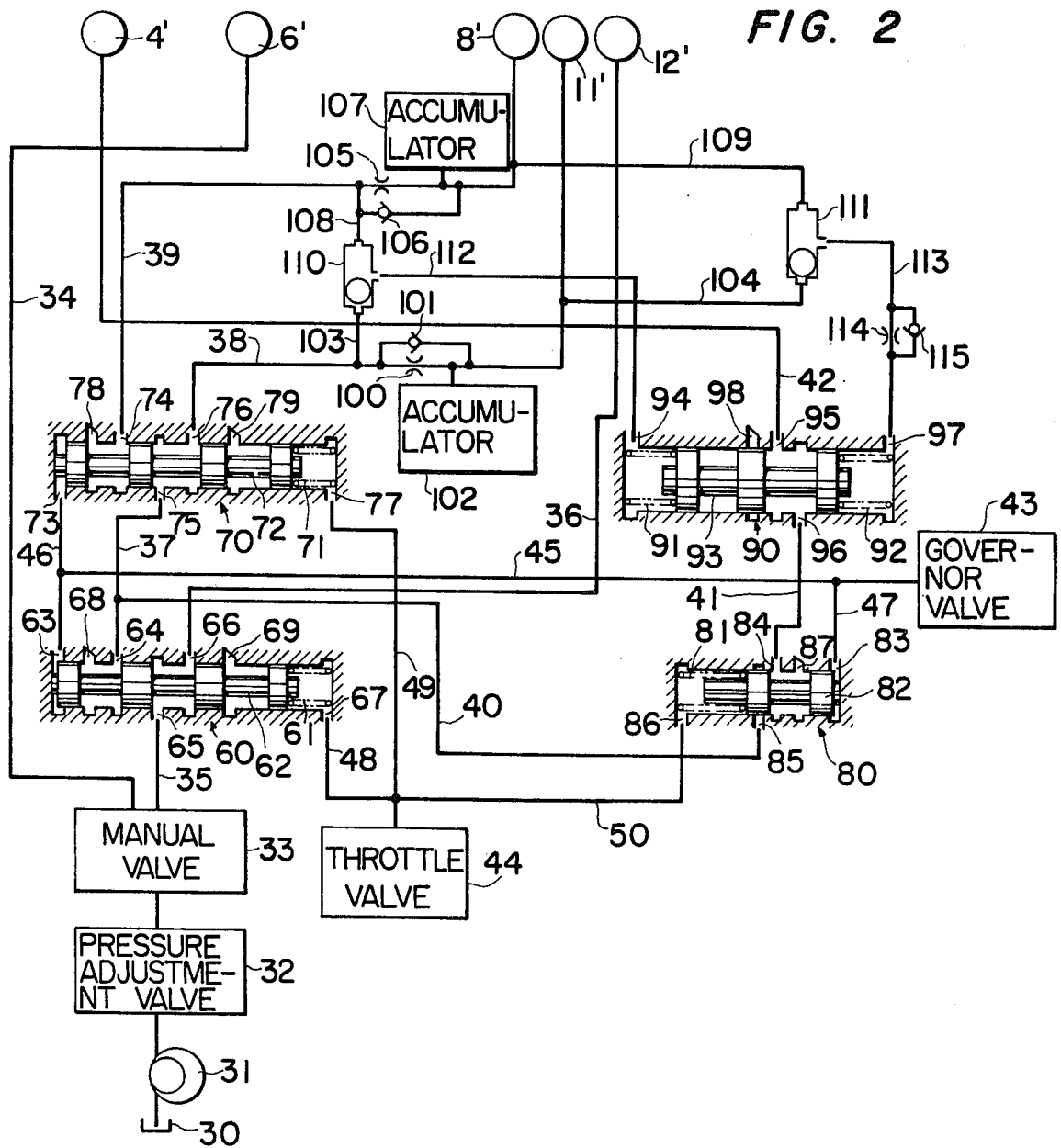
FIG. 2 is a circuit diagram showing an embodiment of the control apparatus of this invention.

Referring now to FIG. 2, a diagram is shown of the preferred embodiment of a control apparatus employing the teachings of this invention. In accordance with the invention, the control apparatus comprises means for automatically and hydraulically controlling both the selective actuation of the speed-change gear mechanism in response to the engine output and vehicle speed, and the selective actuation of the direct-linkage frictional engagement device for directly linking the output shaft of the engine to the input shaft of the speed-change gear mechanism in response to a predetermined engine output and vehicle speed.

As here embodied, fluid from a fluid reservoir 30 is pumped up by a pump 31 to a pressure adjustment valve 32 where the pressure of the fluid is adjusted to a prescribed level. Then, the fluid is introduced to a manual valve 33. On the outlet side of manual valve 33 is a fluid passage 34 connected to a servomechanism 6' for actuating front clutch 6 and fluid passage 35 connected to a first-to-second shift valve 60. From first-to-second valve 60 there is a fluid passage 36 connected to a servomechanism 12' for actuating rear brake 12 and a fluid passage 37 connected to a second-to-third shift valve 70. Fluid passages 38 and 39 from second-to-third shift valve 70 are connected to a servomechanism 11' for actuating front brake 11 and a servomechanism 8' for actuating rear clutch 8, respectively. Further, a fluid passage 40 branced from fluid passage 37 from first-to-second shift valve 60 is connected to a direct-linkage valve 80.

A fluid passage 41 from direct-linkage valve 80 is connected to an interlock valve 90. A fluid passage 42 from interlock valve 90 is connected to a servomechamism 4' for actuating direct-linkage clutch 4. The fluid pressure from manual valve 33 is introduced to a governor valve 43 to generate a governor pressure corresponding to the vehicle drive speed and is guided to a throttle valve 44 to generate a throttle pressure corresponding to the opening of a throttle valve of a carburetor. The governor pressure from governor valve 43 is introduced to both shift valves 60 and 70, and direct-linkage valve 80 through the fluid passages 45 and 47, respectively. The throttle pressure from throttle valve 44 is introduced to both shift valves 60 to 70 and to direct-linkage valve 80 through the fluid passages 48 and 49, and 50, respectively, in such a manner that the governor pressure and the throttle pressure are fed to opposite sides of these valves.

Preferably, first-to-second shift valve 60 comprises a spool 62 urged by a spring 61 on one side, ports 63 and 67 connected to the fluid passages 45, 37 and 40, 35, 36, and 48, respectively, and drain ports 68 and 69. When the governor pressure is low during a low drive speed condition of the vehicle, spool 62 is moved to the left by the force of spring 61 and the throttle pressure from throttle valve 44. Therefore, fluid passages 35 and 36 are connected by ports 65 and 66 and fluid passages 37 and 40 are connected to drain port 68 through port 64. When the governor pressure is increased by an increase in the drive speed, spool 62 is moved to the right by action of the governor pressure from governor valve 43. Therefore, fluid passage 35 is connected to fluid passages 37 and 40 by port 64, and fluid passage 36 is connected to drain port 69 by port 66.

Preferably, second-to-third shift valve 70 comprises a spool 72 urged by a spring 71 on one side, ports 73 and 77 connected to the fluid passages 46, 39, 37, 38, and 49, respectively, and drain ports 78 and 79. Similar to the situation in first-to-second shift valve 60, when the governor pressure is relatively low during a low drive speed condition of the vehicle, spool 72 is moved to the left by the force of spring 71 and the throttle pressure from throttle valve 44. Therefore, fluid passages 37 and 38 are connected by ports 75 and 76 and fluid passage 39 is connected to drain port 78 through port 74. When the vehicular speed is greatly increased, spool 72 is moved to the right by action of the increased governor pressure from governor valve 43. Therefore, fluid passages 37 and 39 are connected by the ports 75 and 74 and, simultaneously, fluid passage 38 is connected to drain port 79 through port 76.

It is also preferred that direct-linkage valve 80 comprise a spool 82 urged by a spring 81 on one side, ports 83 to 86 connected to fluid passages 47, 41, 40, and 50, respectively, and a drain port 87. Similar to the situation for shift valves 60 and 70, direct-linkage valve 80 is actuated in response to the relationship between the governor pressure, corresponding to the drive speed, and the throttle pressure, corresponding to the opening of the throttle valve. Specifically, when the governor pressure is low during a low drive speed condition of the vehicle, spool 82 is moved to the right by the force of spring 81 and the throttle pressure from throttle valve 44. Therefore, passage 40 is blocked at port 85 and fluid passage 41 is connected to drain port 87 through port 84. During a high drive speed condition when the relationship between the drive speed and the opening of the throttle valve is in a condition that keeps the input-to-output speed ratio of the torque converter constant, spool 82 is moved to the left by action of the increased governor pressure from governor valve 43. Therefore, drain port 87 is closed and fluid passages 40 and 41 are connected by ports 84 and 85.

About midway of fluid passage 38 extending between second-to-third shift valve 70 and servomechanism 11' for the second drive speed, there is disposed a portion of a pressure-reducing means including an orifice 100 and a check valve 101, connected in parallel to each other, and an accumulator 102. The fluid pressure to be fed to the servomechanism 11' is reduced and controlled by the pressure-reducing means. Fluid passages 103 and 104 of an operation means are disposed to receive the non-reduced fluid pressure and the reduced fluid pressure on the second-to-third shift valve side and the servomechanism side, respectively, of the pressure-reducing means.

Likewise, about midway of fluid passage 39 extending between second-to-third shift valve 70 and servomechanism 8' for the third drive speed, there is disposed a portion of the pressure-reducing means including an orifice 105 and a check valve 106, connected in parallel to each other, and an accumulator 107. The fluid pressure to be fed to servomechanism 8' is reduced and controlled by the pressure-reducing means. Fluid passages 108 and 109 of the operation means are disposed to receive the non-reduced fluid pressure and the reduced fluid pressure on the second-to-third shift valve side and the servomechanism side, respectively, of the pressure-reducing means. Further, fluid passages 103 and 108 on the second-to-third shift valve side of the pressure-reducing means and fluid passages 104 and 109 on the servomechanism side of the pressure-reducing means are connected to interlock valve 90, respectively, through direction changeover valves 110 and 111 and fluid passages 112 and 113 in such a manner that these fluid pressures act in opposite directions on the opposite sides of interlock valve 90. The operation means further includes orifice 114 and check valve 115, disposed in parallel to each other, and connected only to fluid passage 113 in such a manner that the reduced oil pressure in the fluid passage 104 and 109 on the servomechanism side of the pressure-reducing means is further reduced.

Preferably, interlock valve 90 comprises a spool 93 urged on its sides by springs 91 and 92 having an equal spring force, ports 94 to 97 connected to fluid passages 112, 42, 41, and 113, respectively, and a drain port 98. When fluid pressures fed both from fluid passage 112 to port 94 and from fluid passage 113 to port 97 are zero or equal to each other, spool 93 is located at the center as shown in FIG. 2. Therefore, drain port 98 is closed and fluid passages 41 and 42 are connected through ports 95 and 96. When the fluid pressure applied to port 94 is higher than the fluid pressure applied to port 97, spool 93 is moved to the right to block fluid passage 41 at port 96 and to connect fluid passage 42 to drain port 98 through port 95.

Operation of the control apparatus of this invention will now be described with additional reference to FIGS. 3 and 4.

If a forward drive speed condition is initiated by means of manual valve 33, fluid pressure is fed to servomechanism 6' through fluid passage 34 to allow front clutch 6 to make an engaging action, and also to fluid passage 35. The governor pressure from governor valve 43, corresponding to the drive speed, and the throttle pressure from throttle valve 44, corresponding to the opening of the throttle valve of the carburetor, are fed to both shift valves 60 and 70, and direct-linkage valve 80. When the governor pressure is extremely low during a low drive speed, fluid passages 35 and 36 are connected by means of first-to-second shift valve 60, and fluid pressure in fluid passage 35 is directly fed to servomechanism 12'. This causes actuation of rear brake 12 to establish the first speed in the automatic transmission. At this moment, fluid passage 40 is connected to drain port 68 of first-to-second shift valve 60, and thus no fluid pressure is introduced to that passage. Accordingly, servomechanism 4' of front clutch 4 is not fed fluid pressure regardless of the operation of direct-linkage valve 80 or interlock valve 90, and direct-linkage clutch 4 is therefore relieved.

Figure 3:
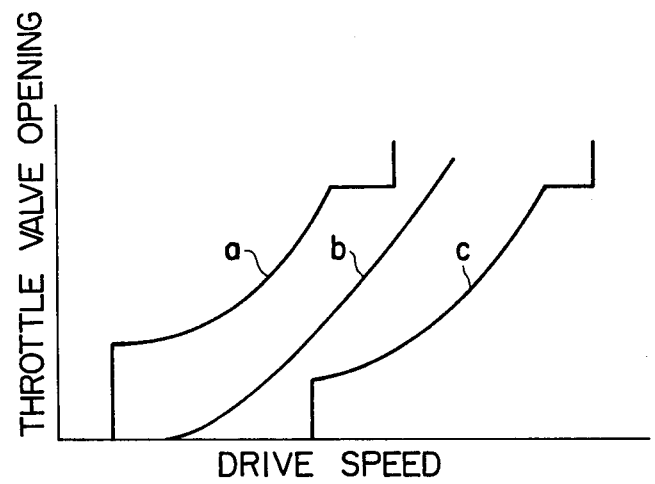
FIG. 3 is a graph showing the relationships between the drive speed and the opening of the throttle valve of a carburetor during certain engine output and drive speed conditions of the vehicle.
Figure 4:
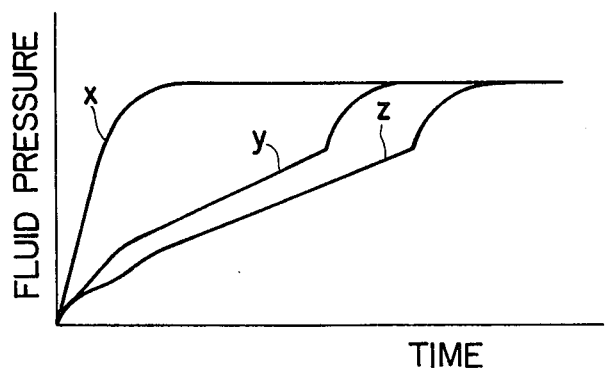
FIG. 4 is a graph showing the relationships between the lapse of time and the fluid pressure in certain segments of a control apparatus of this invention during a second-to-third shift operation.

When the governor pressure increases during an increase of the drive speed and the relationship between the drive speed and the opening of the throttle valve satisfies the condition as shown by the curve $a$ of FIG. 3, the first-to-second speed shift condition is met. Therefore, spool 62 of second-to-first shift valve 60 is moved to the right and fluid pressure on servomechanism 12' is exhausted through drain port 69. This causes rear brake 12 to be relieved and thus the first drive speed condition. Fluid pressure in passage 35 is then introduced to passage 37. Since spool 72 of second-to-third shift valve 70 is still positioned on the left side to connect passages 37 and 38 to each other, the fluid pressure introduced to passage 37 is further fed to servomechanism 11' through passage 38, whereby front brake 11 is actuated to provide the second drive speed condition. During this speed shift, fluid pressure is passage 37 is also fed to passage 40. However, since the relationship between the drive speed and the opening of the throttle valve does not satisfy the condition as shown by curve $b$ of FIG. 3, i.e., the condition of the constant input-to-output speed ratio of the torque converter, fluid passage 40 is blocked from communication with direct-linkage clutch 4 by direct-linkage valve 80. Direct-linkage clutch 4 is therefore kept relieved.

During the second drive speed when the relationship between the drive speed and the opening of the throttle valve satisfies the condition as shown by curve $b$ of FIG. 3, spool 82 of direct-linkage valve 80 is moved to the left and fluid pressure in passage 40 is introduced to passage 41. At this moment, because a period of time has already elapsed since the first-to-second drive speed shift, there is no significant difference in the fluid pressure before and after orifice 100 and accumulator 102 of fluid passage 38 or in the fluid pressure before and after orifice 114 of fluid passage 113. Accordingly, the fluid pressure fed from fluid passage 38 to port 94 of interlock valve 90 through fluid passage 103, direction changeover valve 110 and fluid passage 112, is equal to the fluid pressure fed from fluid passage 38 to port 97 of interlock valve 90 through fluid passage 104, direction changeover valve 111, and fluid passage 112. Since equal pressures are acting on interlock valve 90, spool 93 is located at the center to connect fluid passages 41 and 42 to each other. Fluid pressure in passage 41 is therefore further fed to servomechanism 4' and direct-linkage clutch 4 is engaged to transmit the engine power mechanically in the automatic transmission.

When the drive speed is further increased so that the relationship between the drive speed and the opening of the throttle valve satisfies the condition as shown by curve $c$ of FIG. 3, the second-to-third speed shift condition is met. Therefore, spool 72 of second-to-third shift valve 70 is moved to the right and fluid pressure on servomechanism 11' is exhausted through check valve 101 and drain port 79. This causes front brake 11 to be relieved and thus the second drive speed condition. At this moment, fluid pressure on port 94 of interlock valve 90 is exhausted through the passages as those used to introduce fluid pressure. The fluid pressure on port 97 of interlock valve 90 is also exhausted through check valve 115 and through the passages as those used to introduce the fluid pressure. Therefore, both the fluid pressures on ports 94 and 97 of interlock valve 90 are reduced to zero or made substantially equal to each other and spool 93 is again located at the center to actuate direct-linkage clutch 4 in the same manner as described above.

When spool 72 is moved to the right, the fluid pressure in fluid passage 37 is transmitted to passage 39 by means of second-to-third shift valve 70 for supplying that fluid pressure to servomechanism 8'. Servomechanism 8' will, in turn, cause rear clutch 8 to engage and establish the third drive speed. However, the fluid pressure in passage 39 is reduced and controlled by orifice 105 and accumulator 107, so that the increase in fluid pressure to servomechanism 8' is gradual as best shown by the curve $y$ of FIG. 4. Consequently, the time required for fluid pressure on servomechanism 8' to reach an engagement pressure level is prolonged and the timing for engagement of rear clutch 8 is retarded. At this time, fluid pressure in passage 39 on the second-to-third shift valve side of the pressure-reducing means, which is not reduced by orifice 105 or accumulator 107, is supplied to port 94 of interlock valve 90 through passage 108, direction changeover valve 110 and passage 112. This fluid pressure abruptly rises as best shown by the curve $x$ of FIG. 4. On the other hand, the reduced pressure on the servomechanism side of the pressure-reducing means is being further reduced by orifice 114 as it is supplied through passage 109, direction changeover valve 111 and passage 113 to port 97 of interlock valve 90. Therefore, this fluid pressure has a more gradual rise as best shown by curve $z$ of FIG. 4 than the pressure shown by curve $y$ of FIG. 4.

Because of the higher fluid pressure at port 94 of interlock valve 90, spool 93 is moved to the right. Therefore, The fluid pressure on servomechanism 4' is exhausted through drain port 98 to thereby relieve direct-linkage clutch 4 before rear clutch 8 makes an engaging action and before power is transmitted by the torque converter. Even when the fluid pressure on servomechanism 8' reaches an engagement pressure level and the rear clutch 8 makes an engaging action, fluid pressure at port 97 of interlock valve 90 is still lower by an amount reduced by orifice 114 than the fluid pressure at port 94 of interlock valve 90. Accordingly, direct-linkage clutch 4 remains in a relieved state. After a short time has passed since the engagement of rear clutch 8, the pressure before and after orifice 114 becomes the same and the fluid pressure at port 94 of interlock valve 90 becomes equal to the fluid pressure at port 97 of interlock valve 90. Therefore, spool 93 returns to its original center position and the fluid pressure in passage 41 is fed again to servomechanism 4' to actuate direct-linkage clutch 4 and provide a mechanical power transmission.

Operation of the control apparatus of this invention will now be described during a downshift speed condition. During any of the downshift conditions, shift valve 60 and 70 are operable in a reverse manner because of the reduction of the drive speed. A shift from third speed to second speed causes the pressures on both ports 94 and 97 of interlock valve 90 to be exhausted. The fluid pressure supplied to servomechanism 11' through passage 38 by shift valve 70 is reduced and controlled by orifice 100 and accumulator 102. Since a difference occurs between the non-reduced pressure before and the reduced pressure after orifice 100 and accumulator 102, interlock valve 90 is actuated in the same manner as described above. When the fluid pressure on servomechanism 11' reaches an engagement pressure level during this speed shift to cause front brake 11 to make an engaging action, direct-linkage clutch 4 is temporarily relieved. During the second drive speed condition, when the relationship between the drive speed and the opening of the throttle valve of the carburetor fails to satisfy the condition of a constant input-to-output speed ratio of the torque converter as shown by curve $b$ in FIG. 3, the direct-linkage clutch is relieved by the fluid pressure on servomechanism 4' being exhausted through drain port 87 by means of direct-linkage valve 80.

As is apparent from the foregoing, in an automatic transmission embodying this invention and provided with a torque converter and a directlinkage frictional engagement device disposal in parallel to this torque converter, the torque converter is used only when the torque-increasing activity of the torque converter is required during a low speed drive condition and when the damping effect of the torque converter is required at the time of a speed shift. In all other conditions, the direct-linkage frictional engagement device is used to mechanically transmit the engine power. Therefore, the disadvantages of the conventional automatic transmissions utilizing torque converters such as ineffective engine braking and fuel inefficiency can be resolved.

It should be further noted that since the control apparatus controls both the selective actuation of the direct-linkage frictional engagement device and the speed-change gear mechanism, the structure is simplified. No separate and independent means is necessary for detecting the operating condition of the vehicle.

As can be appreciated, the structure of the direct-linkage valve can be changed appropriately to actuate the direct-linkage frictional engagement device during operating conditions other than when the input-to-output speed ratio of the torque converter is constant.

As can be further seen, the invention could be employed with an automatic transmission of the type having a torque converter other than the one described in this preferred embodiment.

It will be apparent to those skilled in the art that various modifications and variations could be made in the control apparatus of the invention without departing from the scope or spirit of the invention.

What is claimed is:

1. A control apparatus for automatic transmissions of the type with an output shaft of an engine operatively connected to an input shaft of a speed-change gear mechanism having a speed-change planetary gear train responsive to hydraulically actuated speed-change frictional engagement devices for establishing different gear ratios, through a torque converter, and a frictional engagement device disposed in parallel to the torque converter for directly linking the output shaft to the input shaft, said control apparatus comprising means for automatically and hydraulically controlling both the selective actuation of said speed-change gear mechanism in reponse to the engine output and vehicle speed, and the selective actuation of said frictional engagement device for directly linking said output shaft to said input shaft in response to a predetermined engine output and vehicle speed, said means including (a) a governor valve designed to be responsive to the drive speed of the vehicle for generating a governor pressure corresponding to the drive speed; (b) a throttle valve for generating a throttle pressure in response to the opening of a throttle valve of the engine carburetor; (c) shift valve means operatively connected to said speed-change frictional engagement devices and responsive to the pressures generated by said throttle valve and said governor valve for hydraulically controlling the actuation of said speed-change frictional engagement devices and the shifting of said speed-change gear mechanism from one gear ratio to another; (d) a direct-linkage valve operatively connected to said direct-linkage frictional engagement device and responsive to a predetermined relationship of the pressures generated by said throttle valve and said governor valve for hydraulically actuating said direct-linkage frictional engagement device; (e) individual pressure-reducing means for controlling fluid pressure received by selected ones of said speed-change frictional engagement devices from said shift valve means and adjusting the timing of actuation of said selected speed-change frictional engagement devices; (f) operation means for accepting the fluid pressure being received by said pressure-reducing means from said shift valve means and the controlled fluid pressure being received by said selected speed-change frictional engagement devices from said pressure-reducing means; and (g) an interlock valve operatively connected to said operation means and disposed between said direct-linkage frictional engagement device and said direct-linkage valve for introducing to said direct-linkage frictional engagement device the fluid pressure from said direct-linkage valve and exhausting fluid pressure from said direct-linkage frictional engagement device in response to said fluid prssures from said operation means acting on said interlock valve, said interlock valve introducing fluid pressure to said direct-linkage frictional engagement device when receiving fluid pressure from said direct-linkage valve and exhausting fluid pressure from said directlinkage frictional engagement device when deactuated by the fluid pressures from said operation means acting on said interlock valve during a speed shift operation of said speed-change gear mechanism from one gear ratio to another.

2. A control apparatus for automatic transmissions of the type having an output shaft of an engine operatively connected to an input shaft of a speed-change gear mechanism through a torque converter, and a frictional engagement device disposed in parallel to the torque converter for directly linking the output shaft to the input shaft, said control apparatus comprising means for automatically and hydraulically controlling both the selective actuation of said speed-change gear mechanism in response to the engine output and vehicle speed, and the selective actuation of said frictional engagement device for directly linking said output shaft to said input shaft in response to predetermining engine output and vehicle speed, including;
  a. governor valve means designed to be responsive to the drive speed of the vehicle for generating a governor pressure corresponding to the drive speed;
  b. throttle valve means for generating a throttle pressure in response to the opening of a throttle valve of the engine carburetor;
  c. shift valve means operatively connected to said speedchange gear mechanism and responsive to the pressures generated by said throttle valve means and said governor valve means for controlling the shifting of said speed-change gear mechanism from one gear ratio to another; and
  d. direct-linkage valve means operatively connected to said direct-linkage frictional engagement device and responsive to a predetermined relationship of the pressures generated by said throttle valve means and said governor means for hydraulically controlling the actuation of said direct-linkage frictional engagement device; and where said speed-change gear mechanism includes (a) speed-change frictional engagement devices hydraulically actuated by fluid pressure from said shift valve means, and (b) a speed-change planetary gear train responsive to the actuation of said speed-change frictional engagement devices for establishing different gear ratios of said speed-change gear mechanism; and wherein said hydraulic control means further includes (a) means individually disposed between said shift valve means and said direct-linkage frictional engagement device for reducing the fluid pressure received by selected ones of said speed-change frictional engagement devices from said shift valve means and adjusting the timing of actuation of said speed-change frictional engagement devices, (b) operation means for accepting the fluid pressure being received by said pressure-reducing means from said shift valve means and the reduced fluid pressure being received by said direct-linkage frictional engagement devices from said pressure-reducing means, and (c) interlock valve means operatively connected to said operation means and disposed between said direct-linkage frictional engagement device and direct-linkage valve means for introducing to said direct-linkage frictional engagement device the fluid pressure from said direct-linkage valve means and exhausting fluid pressure from said direct-linkage frictional engagement device in response to said fluid pressures of said operation means acting on said interlock valve means.

3. The control apparatus as recited in claim 2, wherein said direct-linkage valve means supplies fluid pressure to said interlock valve means when hydraulically actuated by the fluid pressures from said direct-linkage and governor valve means acting on said direct-linkage valve means during a high speed drive condition; and wherein said interlock valve means introduces fluid pressure to said direct-linkage frictional engagement device when being supplied fluid pressure from said direct-linkage valve means, said interlock valve means exhausting fluid pressure from said direct-linkage frictional engagement device when deactuated by the fluid pressures of said operation means acting on said interlock valve means during a speed shift operation of said speed-change gear mechanism from one gear ratio to another.

4. The control apparatus as recited in claim 3, wherein said speed-change frictional engagement device includes:
  a. a rear brake for shifting to a first speed and a servomechanism for actuating said rear brake;
  b. a front brake for shifting to a second speed and a servomechanism for actuating said front brake;
  c. a front clutch for shifting to a forward drive speed and a servomechanism for actuating said front clutch; and
  d. a rear clutch for shifting to a third speed and a servomechanism for actuating said front clutch; and
wherein said shift valve means includes:
  a. a second-to-third shift valve operatively connected to said front brake servomechanism and said rear clutch servomechanism, said valve selectively supplying fluid pressure to said front brake servomechanism and said rear clutch servomechanism when actuated by the fluid pressures from said throttle and governor valve means acting on said valve;
  b. a first-to-second shift valve operatively connected to said second-to-third shift valve and said rear brake servomechanism, said valve selectively supplying fluid pressure to said rear brake servomechanism and said second-to-third shift valve when actuated by fluid pressures from said throttle and governor valve means acting on said valve; and
  c. a manual valve operatively connected to a fluid pressure source and to said first-to-second shift valve and said front clutch servomechanism, said manual valve supplying fluid pressure to said front clutch servomechanism and said first-to-second shift valve during a forward drive condition of the vehicle.

5. The control apparatus as recited in claim 4, wherein said pressure-reducing means includes (a) a first pressure-reducing means having an orifice and a check valve, connected in parallel to each other, and an accumulator, said first means being disposed between said second-to-third shift valve and said rear clutch servomechanism, and (b) a second pressurereducing means having an orifice and a check valve, connected in parallel to each other, and an accumulator, said second means being disposed between said second-to-third shift valve and said front brake servomechanism; and wherein said operation means includes (a) a first changeover valve operatively connected between said second-to-third shift valve and said first and second pressure-reducing means for accepting fluid pressure being received by said first and second pressure-reducing means, and (b) a second changeover valve operatively connected between said first pressure-reducing means and said rear clutch servomechanism, and said second pressure-reducing means and said front brake servomechanism for accepting reduced fluid pressures being received by said rear clutch and front brake servomechanisms, each of said first and second changeover valves being operatively connected to said interlock valve means, said fluid pressures from said first and second changeover valves thereby acting against said interlock valve means.

6. The control apparatus as recited in claim 4, wherein said operation means further includes a check valve and orifice, connected in parallel to each other, and disposed between said second changeover valve and said interlock valve means, said orifice further reducing said fluid pressure acting against said interlock valve means.

7. In automatic transmissions of the type having an output shaft of an engine operatively connected to an input shaft of a speed-change gear mechanism through a torque converter, a hydraulically actuable frictional engagement device disposed in parallel to the torque converter for directly linking the output shaft to the input shaft, a plurality of hydraulically actuable mechanisms for effecting speed changes in the speed-change gear mechanism, a source of hydraulic pressure, and valve means responsive to the engine output and vehicle speed for selectively applying the hydraulic pressure to the actuable mechanisms, apparatus for automatically controlling the hydraulically actuable, frictional engagement device comprising:

direct linkage control means responsive to a predetermined engine output and vehicle speed for applying the hydraulic pressure to the frictional engagement device;

means for creating a temporary hydraulic pressure differential in at least one of the hydraulic pressures being applied to the individual actuable mechanisms by the valve means for lowering the pressure applied to the individual mechanism and changing the timing of actuation of the mechanism;

means responsive to the temporary hydraulic pressure differential for relieving the hydraulic pressure applied by the direct linkage control means to the frictional engagement means only during the continuance of the pressure differential;

wherein the selected actuable mechanism having lowered hydraulic pressure applied thereto is for effecting relatively high speed, the means for creating a temporary pressure differential comprises a restricted orifice and an accumulator, and the means responsive to the temporary hydraulic pressure includes a floating valve element having one end sensitive to the pressure upstream of the orifice and accumulator and the other end sensitive to the pressure downstream of the orifice and accumulator, increasing pressure being applied sequentially.

8. The apparatus of claim 7 including individual restricted orifices and accumulators for creating pressure differentials applied to at least two actuable mechanisms, the downstream pressures and upstream pressures being respectively applied through common ducts to said floating valve element.

* * * * *